US009542313B2

(12) United States Patent
Hiramoto et al.

(10) Patent No.: US 9,542,313 B2
(45) Date of Patent: Jan. 10, 2017

(54) PARALLEL COMPUTER SYSTEM, CONTROL METHOD OF PARALLEL COMPUTER SYSTEM, INFORMATION PROCESSING DEVICE, ARITHMETIC PROCESSING DEVICE, AND COMMUNICATION CONTROL DEVICE

(71) Applicant: FUJITSU LIMITED, Kawasaki-shi, Kanagawa (JP)

(72) Inventors: Shinya Hiramoto, Yokohama (JP); Tomohiro Inoue, Kawasaki (JP); Masahiro Maeda, Zama (JP); Shun Ando, Yokohama (JP); Yuta Toyoda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 63 days.

(21) Appl. No.: 14/540,381

(22) Filed: Nov. 13, 2014

(65) Prior Publication Data

US 2015/0154115 A1    Jun. 4, 2015

(30) Foreign Application Priority Data

Nov. 29, 2013   (JP) ................................ 2013-248582

(51) Int. Cl.
*G06F 12/00*     (2006.01)
*G06F 13/00*     (2006.01)
(Continued)

(52) U.S. Cl.
CPC .......... *G06F 12/0804* (2013.01); *G06F 9/526* (2013.01); *G06F 12/0811* (2013.01);
(Continued)

(58) Field of Classification Search
CPC .............. G06F 12/0804; G06F 12/0811; G06F 12/0815; G06F 12/0842; G06F 2212/1024; G06F 2212/283; G06F 9/526
(Continued)

(56) References Cited

U.S. PATENT DOCUMENTS

| 2008/0091884 | A1* | 4/2008 | Piry ................... G06F 12/0831 |
| | | | 711/141 |
| 2009/0077322 | A1* | 3/2009 | Johns .................. G06F 12/0831 |
| | | | 711/141 |

(Continued)

FOREIGN PATENT DOCUMENTS

| JP | 2008-204101 | 9/2008 |
| JP | 2010-507160 | 3/2010 |
| WO | 2012/137339 A1 | 10/2012 |

OTHER PUBLICATIONS

Extended European Search Report issued May 7, 2015 in corresponding European Patent Application No. 14192720.2.

*Primary Examiner* — Sheng-Jen Tsai
(74) *Attorney, Agent, or Firm* — Staas & Halsey LLP (57) ABSTRACT

A parallel computer system includes information processing devices, each of the information processing devices including a communication control device that performs communication, a main memory that stores data, and an arithmetic processing device that is coupled to the communication control device and the main memory, the information processing devices being coupled to each other through a network by the respective communication control device, wherein the arithmetic processing device includes a cache memory and a cache controller, the cache controller that executes an atomic operation for target data on the cache memory that stores the target data when the communication control device outputs an atomic operation request that is used to request the atomic operation, the atomic operation (Continued)

being not divided into a smaller operation, and notifies the communication control device of a result that is obtained by executing the atomic operation on the cache memory.

6 Claims, 6 Drawing Sheets

(51) Int. Cl.
 *G06F 13/28* (2006.01)
 *G06F 12/08* (2016.01)
 *G06F 9/52* (2006.01)

(52) U.S. Cl.
 CPC ...... *G06F 12/0815* (2013.01); *G06F 12/0842* (2013.01); *G06F 2212/1024* (2013.01); *G06F 2212/283* (2013.01)

(58) Field of Classification Search
 USPC .......................................................... 711/120
 See application file for complete search history.

(56) References Cited

U.S. PATENT DOCUMENTS

| 2010/0100688 | A1  | 4/2010  | Harper et al. |                       |
|--------------|-----|---------|---------------|-----------------------|
| 2010/0281220 | A1* | 11/2010 | Cantin        | G06F 12/084 711/130   |
| 2010/0318747 | A1* | 12/2010 | Abts          | G06F 12/0804 711/144  |
| 2013/0275663 | A1* | 10/2013 | Lin           | G06F 9/3004 711/105   |
| 2014/0040558 | A1* | 2/2014  | Ajima         | G06F 15/173 711/130   |
| 2015/0089145 | A1* | 3/2015  | Steinmacher-Burow | G06F 9/3004 711/130 |

\* cited by examiner

| PACKET TYPE | ROUTING HEADER | LOCAL NODE ADDRESS |
| --- | --- | --- |
| REMOTE NODE ADDRESS | OFFSET | ATOMIC OPERATION TYPE |
| PAYLOAD | | |

FIG. 4

| ATOMIC OPERATION TYPE | ATOMIC OPERATION TARGET ADDRESS | SEQUENCE NUMBER |
| --- | --- | --- |
| OPERAND | | |

FIG. 5

| VALID | EXECUTION SOURCE | SEQUENCE NUMBER | DATA |
|---|---|---|---|

| SEQUENCE NUMBER | NUMBER OF RECEIVED RESPONSES | STATE | DATA |
|---|---|---|---|
| × × × × | 0 | STANDBY | ABSENCE |
| ... | ... | ... | ... |

FIG. 8

PARALLEL COMPUTER SYSTEM, CONTROL METHOD OF PARALLEL COMPUTER SYSTEM, INFORMATION PROCESSING DEVICE, ARITHMETIC PROCESSING DEVICE, AND COMMUNICATION CONTROL DEVICE

CROSS-REFERENCE TO RELATED APPLICATION

This application is based upon and claims the benefit of priority of the prior Japanese Patent Application No. 2013-248582, filed on Nov. 29, 2013, the entire contents of which are incorporated herein by reference.

FIELD

The embodiments discussed herein are related to a parallel computer system, a control method of the parallel computer system, an information processing device, an arithmetic processing device, and a communication control device.

BACKGROUND

In a parallel computer system that is constituted so that a plurality of information processing devices (computers) is coupled to a network as data processing computers (nodes), higher performance may be obtained as the number of nodes that are coupled to the network is increased. Therefore, processing in which high performance is requested is generally caused to be executed by the parallel computer system.

The parallel computer system is a distributed-memory type computer system in which each of the nodes includes a memory space. Therefore, each of the nodes obtains data from further piece of data as appropriate.

Each of the nodes includes a communication control device such as a network interface card (NIC) for communication through a network, and an arithmetic processing device such as a central processing unit (CPU). Generally, in the arithmetic processing device, a plurality of processor cores that functions as a single processor are installed, and in each of the processer cores, a cache memory is provided. Using them, the arithmetic processing device reads desired data on a main memory onto the cache memory.

In the cache memory, a plurality of cache lines is provided as a data storage area. Reading and writing of data in the cache memory is performed in a unit of the cache line.

Data on the cache memory is updated as appropriate. Therefore, the data on the cache memory may not be matched with data on the main memory and data on a further cache memory. In order to execute appropriate processing, it is desirable that appropriate data is used. Therefore, in a system environment in which the plurality of cache memories exists such as the parallel computer system, cache coherency control is performed so that there is no conflict between contents of the plurality of cache memories. A cache coherency protocol is a protocol that is used for the cache coherency control, and as the cache coherency protocol, there are a MSI protocol, a MESI protocol, a MOESI protocol, and the like.

In the MOESI protocol, the states of the cache lines on the cache memory are classified into five states of "M" (Modified), "O" (Owned), "E" (Exclusive), "S" (Shared), and "I" (Invalid).

In the "M" state, data merely exists on the cache memory of the processor core, and the content of the data is not matched with a content of data on the main memory. In the "E" state, data merely exists on the cache memory of the processor core, and the content of the data is matched with a content of data on the main memory. In the "S" state, data exists on the cache memory of the processor core and a further cache memory. In the "I" state, a cache line is invalid. In the O state, a content of data on the cache memory of the processor core is not matched with a content of data on the main memory, and the data on the cache memory of the processor core exists on a further cache memory as well. The "O" state is different from the "S" state in that write-back caching in which data is stored in the main memory is performed. That is, in the plurality of cache memories in which data that is not matched with a content of data on the main memory exists, merely a single cache memory becomes in the O state, and the other cache memories become in the S state.

Generally, for the parallel computer system, "multi-thread" is employed in which the nodes execute the smallest execution units of programs, which are called threads, all at the same time. Pieces of data that are stored on the main memories by the nodes are shared resources, and it is desirable that the pieces of data are synchronized. As an operation that is executed in the parallel computer system, there is an atomic operation that is not divided into a smaller operation in order to synchronize the pieces of data or perform exclusive control.

The atomic operation corresponds to a plurality of series of operations that are used to execute simple mathematical calculation or simple logical calculation for data. When the atomic operation is being executed, data is locked, and the atomic operation is completed before access by a further thread. Therefore, the pieces of data may be synchronized.

As the atomic operation, for example, there is "Fetch and Add". "Fetch and Add" includes the following series of operations.

(1) Read data from the main memory onto the cache memory (2) Combine the read data and an operand (3) Perform write-back caching of the addition result to the main memory When "Fetch and Add" is being executed, a further thread (or process) is not allowed to access data that is a read target on the main memory. As a result, it is avoided that the further thread obtains data before the addition result and performs rewriting to the addition result.

There are further various examples of the atomic operation. For example, "Compare and Swap" is an atomic operation in which values of data of an operand and data on the main memory are compared with each other, and when the values of the data of the operand and the data on the main memory are matched with each other, the data on the main memory is replaced with a value of data of a further operand.

Even when the atomic operation is executed between nodes, it is desirable that consistency of the cache memories (cache coherency) is kept. Therefore, in a related art, an arithmetic processing device (processor core that is installed in the arithmetic processing device) checks a state of a cache line in which target data of the atomic operation is stored, and executes processing that corresponds to the check result. For example, when the checked state of the cache line is the E state or the S state as the check result, the arithmetic processing device causes the state to transit to the I state, and when the checked state of the cache line is the M state or the O state, the arithmetic processing device performs write-back caching of the target data to the main memory and causes the state to transit to the I state. After that, the arithmetic processing device executes the atomic operation for the target data on the main memory. Due to such processing, the cache coherency may be kept.

Japanese National Publication of International Patent Application No. 2010-507160, and Japanese Laid-open Patent Publication No. 2008-204101 are the related arts.

SUMMARY

According to an aspect of the invention, a parallel computer system includes a plurality of information processing devices, each of the plurality of information processing devices including a communication control device that performs communication; a main memory that stores data; and an arithmetic processing device that is coupled to the communication control device and the main memory, the plurality of information processing devices being coupled to each other through a network by the respective communication control device, wherein the arithmetic processing device includes a cache memory and a cache controller, the cache controller that executes an atomic operation for target data on the cache memory that stores the target data when the communication control device outputs an atomic operation request that is used to request the atomic operation, the atomic operation being not divided into a smaller operation, and notifies the communication control device of a result that is obtained by executing the atomic operation on the cache memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

It takes a long time to execute an operation for data on the main memory. Therefore, in a node that requests the atomic operation in the related art, latency that is a time to until a response is obtained after the atomic operation is requested is also increased. In order to execute further effective processing, it is desirable that the latency is further reduced.

Therefore, it is important to achieve the cache coherency while the latency at the time of the atomic operation is further reduced.

Therefore it is desired to provide a technology by which cache coherency is achieved while latency at the time of an atomic operation between nodes is further reduced.

Figure 1:
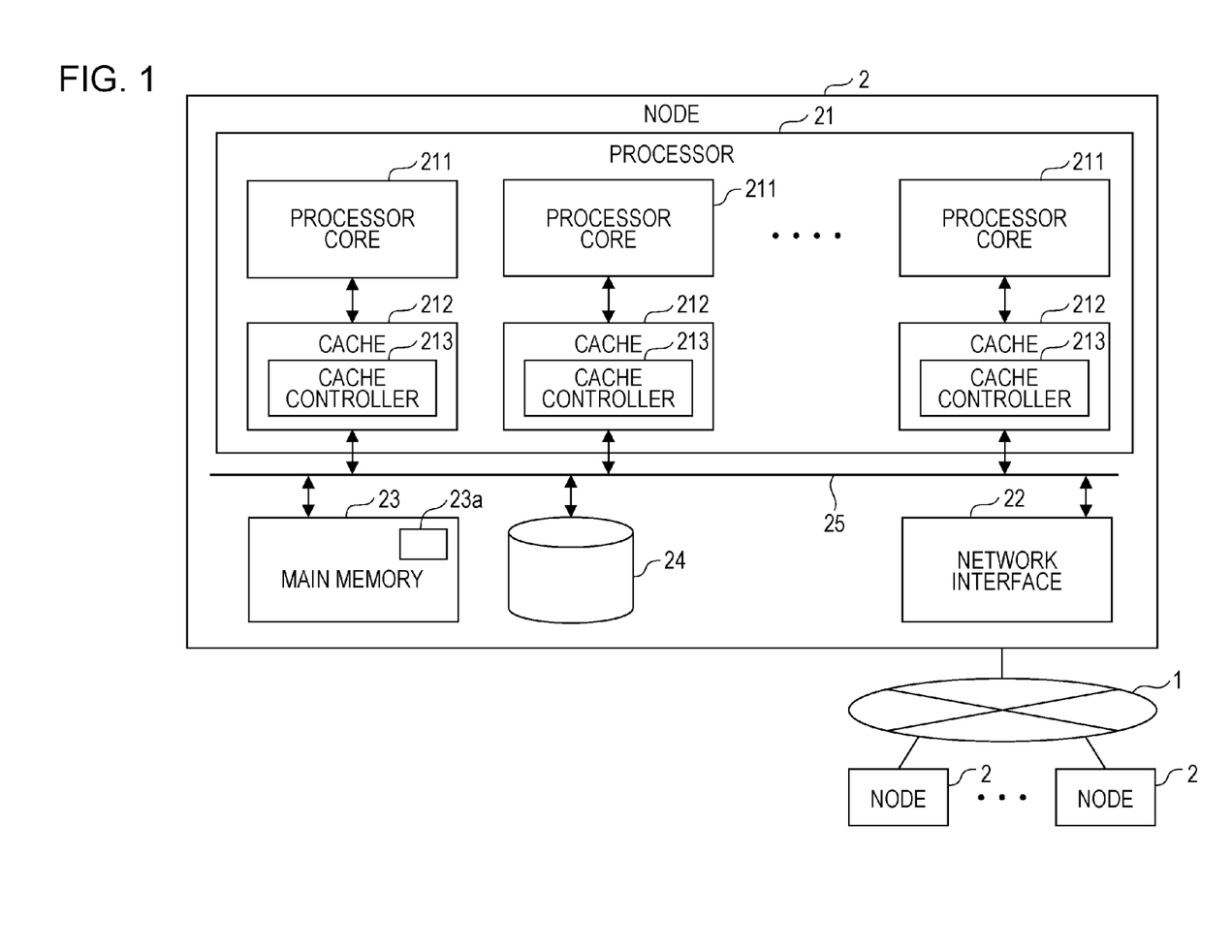
FIG. 1 is a diagram illustrating a structure example of a parallel computer system according to an embodiment.

The embodiments discussed herein are described below in detail with reference to drawings. FIG. 1 is a diagram illustrating a structure example of a parallel computer system according to an embodiment.

The parallel computer system according to the embodiment is a computer system that uses an information processing device according to the embodiment as a node 2. As illustrated in FIG. 1, the parallel computer system is constituted so that the plurality of nodes 2 is coupled to the network 1.

As illustrated in FIG. 1, in each of the nodes 2, a processor 21 that is an arithmetic processing device, a network interface device 22, a main memory 23, and a hardware disk device 24 are coupled to each other through a memory bus 25. In the processor 21, a plurality of processor cores 211 and cache memories 212 that are respectively prepared for the processor cores are installed.

The processor 21 that is installed in each of the nodes 2 is the arithmetic processing device according to the embodiment. The network interface device 22 that is installed in each of the nodes 2 is a communication control device according to the embodiment. The main memory 23 that is installed in each of the nodes 2 is a storage device according to the embodiment.

Each of the cache memories 212 includes a cache controller 213. Each of the cache memories 212 further includes, for example, a data unit that is used to store data, a tag unit that is used to store a tag, and a tag state management unit that manages a state of each of the cache lines (not illustrated). The cache controller 213 controls the data unit, the tag unit, and the tag state management unit.

Each of the tag unit and the data unit includes the same number of entries. The single cache line includes one entry of the tag unit and one entry of the data unit. Here, for descriptive purposes, it is assumed that a direct mapping scheme is employed for the cache memory 212. In the direct mapping scheme, the data unit includes one entry (space) that is able to store data that corresponds to an address. Therefore, in the direct mapping scheme, the single cache line includes one entry of the tag unit and one entry of the data unit which corresponds to the one entry of the tag unit.

The tag state management unit also includes the same number of entries as the tag unit and the data unit. In each of the entries, state data that indicates the state of the corresponding cache line is stored. Here, it is assumed that the MOESI protocol is employed as the cache coherency protocol. As described above, in the MOESI protocol, the states of the cache lines are classified into five states of "M" (Modified), "O" (Owned), "E" (Exclusive), "S" (Shared), and "I" (Invalid). Therefore, state data that is included in each of the entries indicates one of the five states.

The cache controller 213 is a controller that may execute an operation for a certain cache line. As the operation that may be executed, an atomic operation is included. Therefore, the cache memory 212 executes a requested atom operation by the cache controller 213.

The main memory 23 includes a memory controller 23a. The memory controller 23a may execute an operation for data that is stored in a certain address of the main memory 23.

A certain processor core 211 that is installed in the processor 21 requests an atomic operation for a further processor core 211 and a further node 2 as appropriate. Generally, latency of an atomic operation by a further node 2 is very long as compared with latency of an atomic operation by a further processor core 211 in the node 2. This is why, in the atomic operation of the further node 2, a time that is taken for communication through the network 1 is also included in the latency. Therefore, in the embodiment, latency of an atomic operation that is requested between the nodes 2 is further reduced. An operation that is related to an atomic operation that is requested between the nodes 2 is described below in detail while the cache memory 212, the network interface device 22, and the main memory 23 of each of the processor cores 211 are considered.

Figure 2:
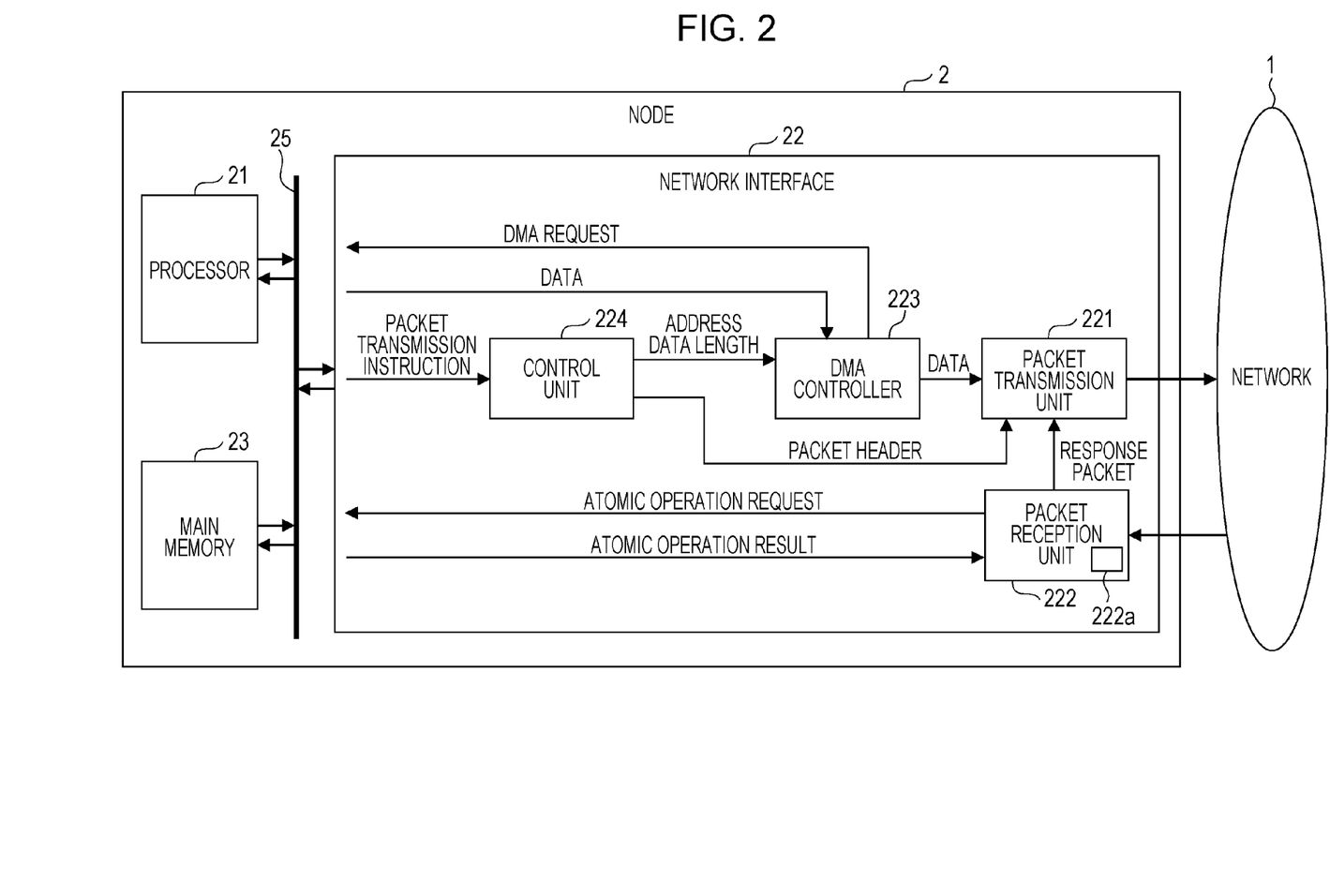
FIG. 2 is a diagram illustrating a structure example of a network interface device that is a communication control device according to the embodiment.

FIG. 2 is a diagram illustrating a structure or configuration example of a network interface device that is a communication control device according to the embodiment.

The network interface device 22 is a communication control device that performs communication between the nodes 2 through the network 1 in a unit of a packet. As illustrated in FIG. 2, the network interface device 22 includes a packet transmission unit 221, a packet reception unit 222, a direct memory access (DMA) controller 223, and a control unit 224.

The control unit 224 causes a packet to be generated and transmitted to the network 1 in response to a packet transmission instruction from a certain processor core 211 that is installed in the processor 21. For this purpose, the control unit 224 controls the packet transmission unit 221 and the DMA controller 223.

The packet transmission unit 221 transmits a packet to the network 1. The packet header that includes an address of the node 2 that is a transmission destination of the packet (remote node) is output from the control unit 224 to the packet transmission unit 221. The control unit 224 generates the packet header in response to a packet transmission instruction.

The DMA controller 223 accesses the main memory 23 not through the processor 21 in response to an instruction from the control unit 224. The control unit 224 notifies an address and a data length to the DMA controller 223 with reference to the packet transmission instruction, and causes the DMA controller 223 to access the main memory 23. The DMA controller 223 outputs data that is read from the main memory 23, to the packet transmission unit 221 in response to the instruction of the control unit 224. Therefore, the packet transmission unit 221 adds the data that has been obtained from the DMA controller 223, to the packet header that has been obtained from the control unit 224, as a payload to generate a packet, and transmits the generated packet to the network 1.

In the packet that is generated by the packet transmission unit 221, a packet that is used to request an atomic operation (hereinafter referred to as "atomic operation request packet") is included. The atomic operation request packet has a structure that is illustrated, for example, in FIG. 3.

Figure 3:
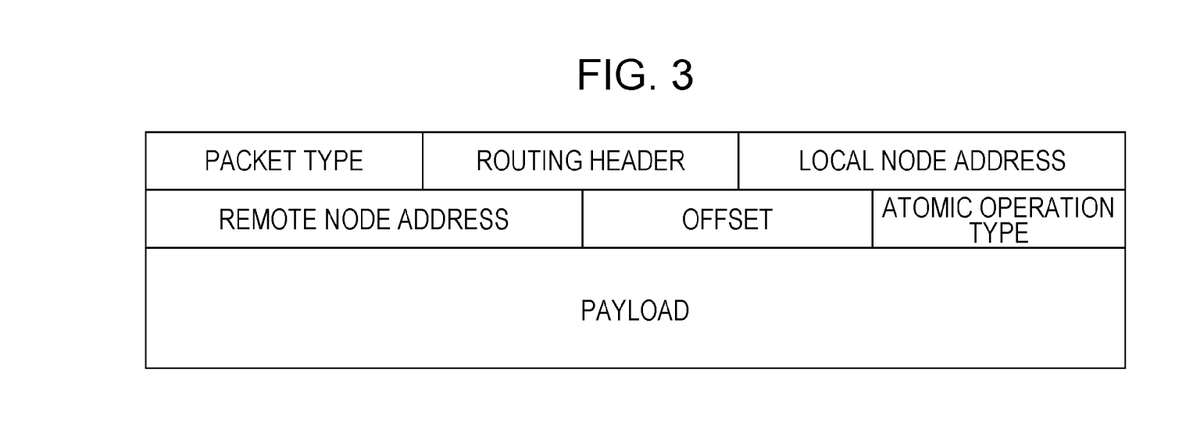
FIG. 3 is a diagram illustrating a structure example of an atomic operation request packet.

The packet is roughly divided into a packet header and a payload. As illustrated in FIG. 3, in the packet header of the atomic operation request packet, for example, pieces of data of a packet type, a routing header, a local node address, a remote node address, an offset, and an atomic operation type are stored.

The packet type data is data that indicates the type of the packet. The routing header data is data that specifies a path from a local node that is a transmission source of the packet to a remote node that is a transmission destination of the packet. The local node address is data that indicates an address of the local node, and the remote node address is data that indicates an address of the remote node. The offset data is data that indicates an address on the main memory 23 that stores target data for which an atomic operation is executed. The atomic operation type is data that indicates the type of the atomic operation.

In the payload, an operand that is used for the atomic operation is included. Therefore, in the node (remote node) 2 that receives an atomic operation request packet, an atomic operation that is indicated by the atomic operation type may be executed for target data that is specified by the offset data using the operand in the payload.

Figure 4:
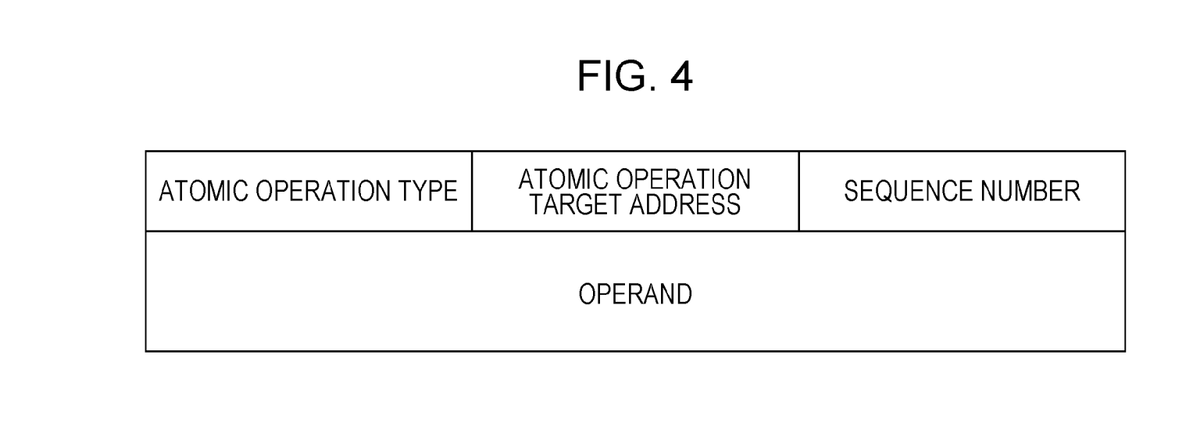
FIG. 4 is a diagram illustrating a structure example of an atomic operation request that is one of internal messages.

The packet reception unit 222 in the network interface device 22 of the remote node 2 that is specified by the remote node address receives an atomic operation request packet that is transmitted to the network 1 by a further node 2. When the packet reception unit 222 receives the atomic operation request packet, the packet reception unit 222 generates an internal message having a structure as illustrated in FIG. 4, and outputs the generated internal message to the memory bus 25. Hereinafter, the internal message is referred to as "atomic operation request".

As illustrated in FIG. 4, the atomic operation request includes pieces of data of an atomic operation type, an atomic operation target address, a sequence number, and an operand.

The atomic operation type is data that indicates the type of an atomic operation similar to the atomic operation request packet. The atomic operation target address is data that indicates an address on the main memory 23 that stores target data of an atomic operation. The atomic operation target address is an offset itself or data that is generated using the offset and an operand in a payload.

The sequence number is data that is used to identify an atomic operation request. The operand is data that is used for an atomic operation, and the operand is different from the operand that is used to generate an atomic operation target address.

The atomic operation request is a message for all of the cache memories 212 that are installed in the processor 21 and the main memory 23. Since the atomic operation request is notified to all of the cache memories 212 and the main memory 23 in the embodiment, all of the cache memories 212 and the main memory 23 are caused to execute atomic operations by the atomic operation request in parallel, and reply results that are obtained by executing the atomic operations as responses.

Figure 5:
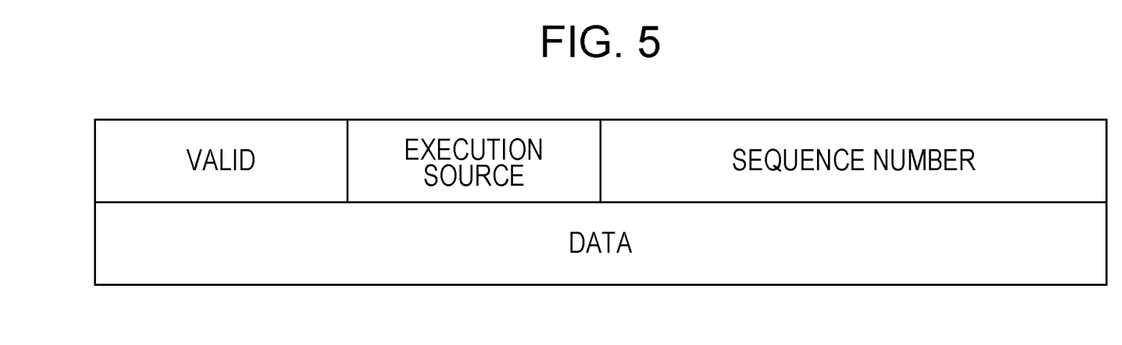
FIG. 5 is a diagram illustrating a structure example of a response of an atomic operation request.

As illustrated in FIG. 5, each of the responses that are replied from the cache memories 212 and the main memory 23 includes, for example, "valid", "execution source", "sequence number", and "data".

The valid data is data that indicates whether or not an atomic operation by an atomic operation request is executed. The execution source data is data that indicates an execution source of the atomic operation by the atomic operation request, that is, a reply source of the response, and for example, is a value that indicates whether the execution source is the main memory or the cache memory. The sequence number is a sequence number that is stored in the atomic operation request. The data is data before the atomic operation of the atomic operation target address is executed.

The memory controller 23a of the main memory 23 receives an atomic operation request that has been transferred through the memory bus 25, and processes the received atomic operation request. The memory controller 23a executes the requested atomic operation for data of the atomic operation target address, and causes the data after the atomic operation has been executed to be stored newly on the main memory 23. At that time, the response is generated using data that indicates execution of an atomic operation as the valid data, sequence information that is stored in the atomic operation request as the sequence number, and the data before the atomic operation is executed.

In each of the cache memories 212, the atomic operation request is processed by the cache controller 213. Differently from the main memory 23, in the cache memory 212, each of the cache lines is managed on the basis of the state. The cache controller 213 checks the state of the cache line in which the data of the atomic operation target address is stored, and executes an atomic operation in accordance with the checked state.

In the MOESI protocol, the states of the cache lines are classified into five states of "M", "O", "E", "S", and "I". In the states other than the I state, valid data of the atomic operation target address exists in the cache line. Therefore, the cache controller 213 executes an atomic operation for the data of the cache line and updates the data of the cache line when the state is other than the I state, that is, one of the states of "M", "O", "E", and "S". After updating the data, the cache controller 213 generates a response using the valid data that indicates execution of an atomic operation, and outputs the generated response to the memory bus 25. Data that is stored in the response is data before the atomic operation is executed.

When the state is the I state or when there is no cache line in which data of the atomic operation target address is stored, the cache controller 213 generates a response without execution of the atomic operation, and outputs the generated response to the memory bus 25. At that time, valid data that is stored in the response is data that indicates non-execution of an atomic operation.

The state of the cache line is kept regardless of whether or not an atomic operation is executed, and the state. This is why an atomic operation for data of the cache line is executed even on the main memory 23 that stores the data of the cache line as described above.

Figure 7:
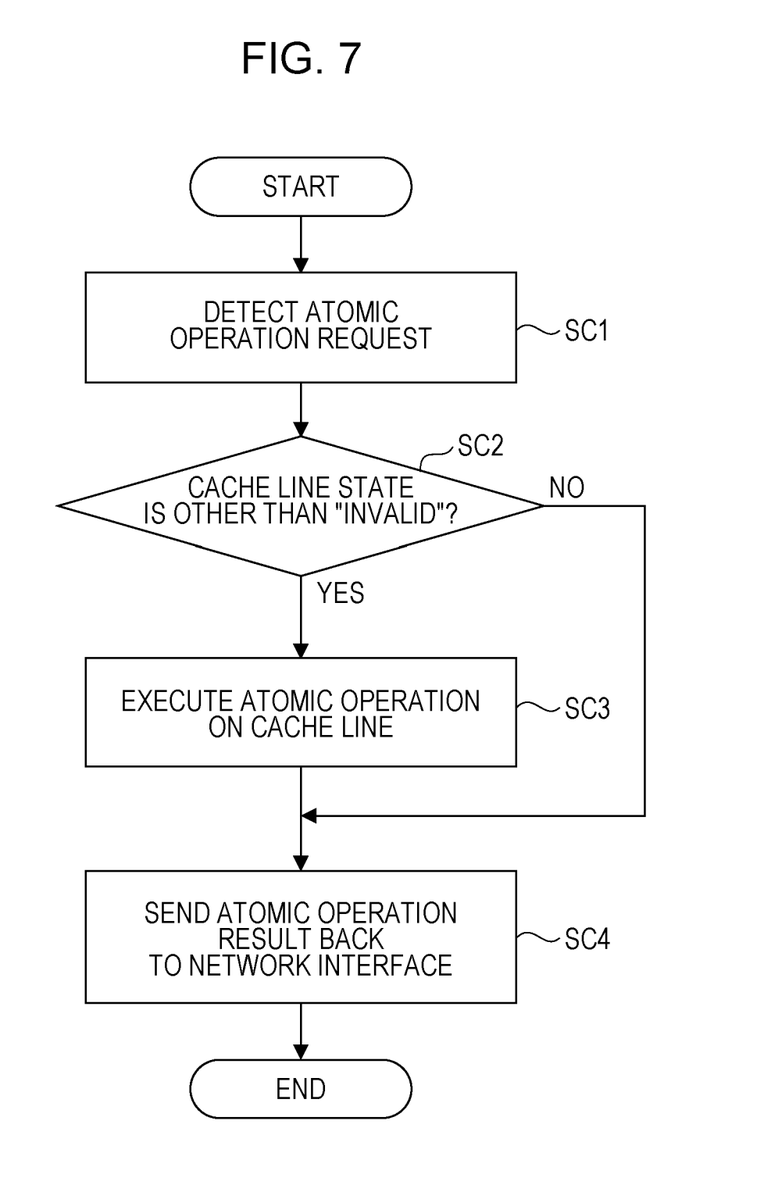
FIG. 7 is a flowchart illustrating atomic operation request processing by a cache controller.

FIG. 7 is a flowchart of atomic operation request processing by the cache controller. This atomic operation request processing corresponds to a flow of a series of pieces of processing that are executed by the cache controller 213 for processing of an atomic operation request when the atomic operation request is received. The atomic operation request processing is described below in detail with reference to FIG. 7.

The cache controller 213 monitors a message that has been transferred through the memory bus 25, and detects an atomic operation request when the packet reception unit 222 outputs the atomic operation request to the memory bus 25 (SC1). When the cache controller 213 detects the atomic operation request, a cache line that stores data of an atomic operation target address of the detected atomic operation request is hit, and the cache controller 213 determines whether or not the hit cache line corresponds to the state other than the I state (SC2). When a cache line that stores data of an atomic operation target address is not hit, or when the hit cache line corresponds to the I state, "No" is determined in SC2, and the flow proceeds to SC4. When a cache line that stores data of an atomic operation target address is hit, and the hit cache line corresponds to the state other than the I state, "Yes" is determined in SC2, and the flow proceeds to SC3.

In SC3, the cache controller 213 executes an atomic operation that is specified by an atomic operation type of the detected atomic operation request for data of the hit cache line, using an operand of the detected atomic operation request. At that time, data after the atomic operation is executed is newly written on the cache line, and data before the atomic operation is executed is stored in the cache controller 213. Write-back caching of the addition result to the main memory 213 is not performed.

The cache controller 213 that has updated the data on the cache line generates a response using valid data that indicates execution of an atomic operation, a sequence number of an atomic operation request, and data before the atomic operation is executed, and outputs the generated response to the memory bus 25 (SC4). After that, the atomic operation request processing ends.

When the flow proceeds from SC2 to SC4, the cache controller 213 generates a response using valid data that indicates non-execution of an atomic operation and a sequence number of an atomic operation request, and outputs the generated response to the memory bus 25 (SC4). After that, the atomic operation request processing ends.

As described above, in the cache controller 213, the atomic operation request is processed even on the main memory 23, so that write-back caching to the main memory 23 or the like is not performed even when the state of the cache line is one of the M state and the O state. Therefore, the atomic operation request is processed in a very short time period. The consistency between the cache memories 212, that is, cache coherency is kept when the atomic operation request is processed by the main memory 23 unconditionally.

The response that has been output from each of the cache memories 212 and the main memory 23 to the memory bus 25 is received by the packet reception unit 222 of the network interface device 22 to be processed.

When the packet reception unit 222 receives the response from the cache memory 212, the packet reception unit 222 transmits a response to the atomic operation request packet to the network 1, where the response is referred to as "atomic operation response packet" hereinafter.

The atomic operation response packet includes a structure similar to that of the atomic operation request packet (FIG. 3). The atomic operation response packet is different from the atomic operation request packet in that there is no atomic operation type data in the packet header. When there is the cache memory 212 or the main memory 23 that executes an atomic operation, data that is stored in a response of the atomic operation request is included in the payload. When there is no the cache memory 212 and the main memory 23 that execute an atomic operation, data that indicates non-execution of the atomic operation is included in the payload.

Figure 6:
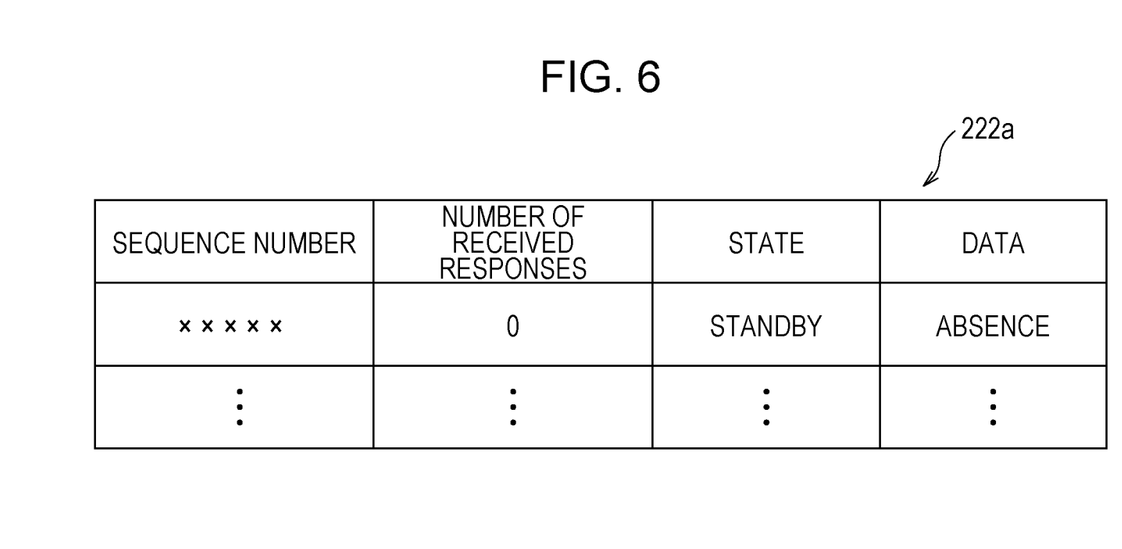
FIG. 6 is a diagram illustrating a structure example of processing status information.

Generally, the response of the atomic operation request is replied from the cache memory 212 early as compared with the main memory 23. However, for some reasons, it is probable that the response is replied from the main memory 23 early as compared with the cache memory 212 that has executed an atomic operation. It is highly probable that the response from the cache memory 212 that has not executed an atomic operation is output early as compared with the cache memory 212 that has executed an atomic operation. In addition, it is probable that all of the cache memories 212 do not execute atomic operations. When all of the cache memories 212 do not execute atomic operations, it is desirable that data that is stored in the response from the main memory 23 is included in the payload of the atomic operation response packet. Therefore, the packet reception unit 222 uses processing status information 222a for identifying a trigger at which an atomic operation response packet is to be transmitted.

FIG. 6 is a diagram illustrating a structure or a configuration example of the processing status information. In FIG. 6, the structure example of the processing status information 222a is illustrated in a table format. Here, it is assumed that the processing status information 222a is information in the table format. The processing status information 222a may be information in a format that is other than the table format.

As illustrated in FIG. 6, the processing status information 222a is a table that stores items of a sequence number, the number of received responses, a state, and data in one record (entry), for each received atomic operation request packet.

The sequence number is, for example, a value that is obtained by incrementing a sequence number that is assigned to the most recent received atomic operation request packet, and is used for extraction of an entry that is to be referred to, from the processing status information 222a. The number of received responses is data that indicates the number of received responses from the cache memories 212 and the main memory 23. Here, "0" illustrated in FIG. 6 is an initial value that indicates that a response is not received from any one of the cache memories 212 and the main memory 23.

The state in FIG. 6 is data that indicates whether an atomic operation response packet is transmitted. Here, "standby" illustrated in FIG. 6 indicates a standby state in which an atomic operation response packet is not transmitted. When an atomic operation response packet is transmitted, the state is updated from the standby state to a transmission completion state.

The data in FIG. 6 is data that indicates the presence or absence of data that is stored as a payload of the atomic operation response packet, that is, data that indicates the presence or absence of reception of a response that includes valid data that indicates execution of an atomic operation. Here, "absence" illustrated in FIG. 6 indicates that a response that includes valid data that indicates execution of an atomic operation is not received. When the response is received, "presence" is illustrated in the record.

Figure 8:
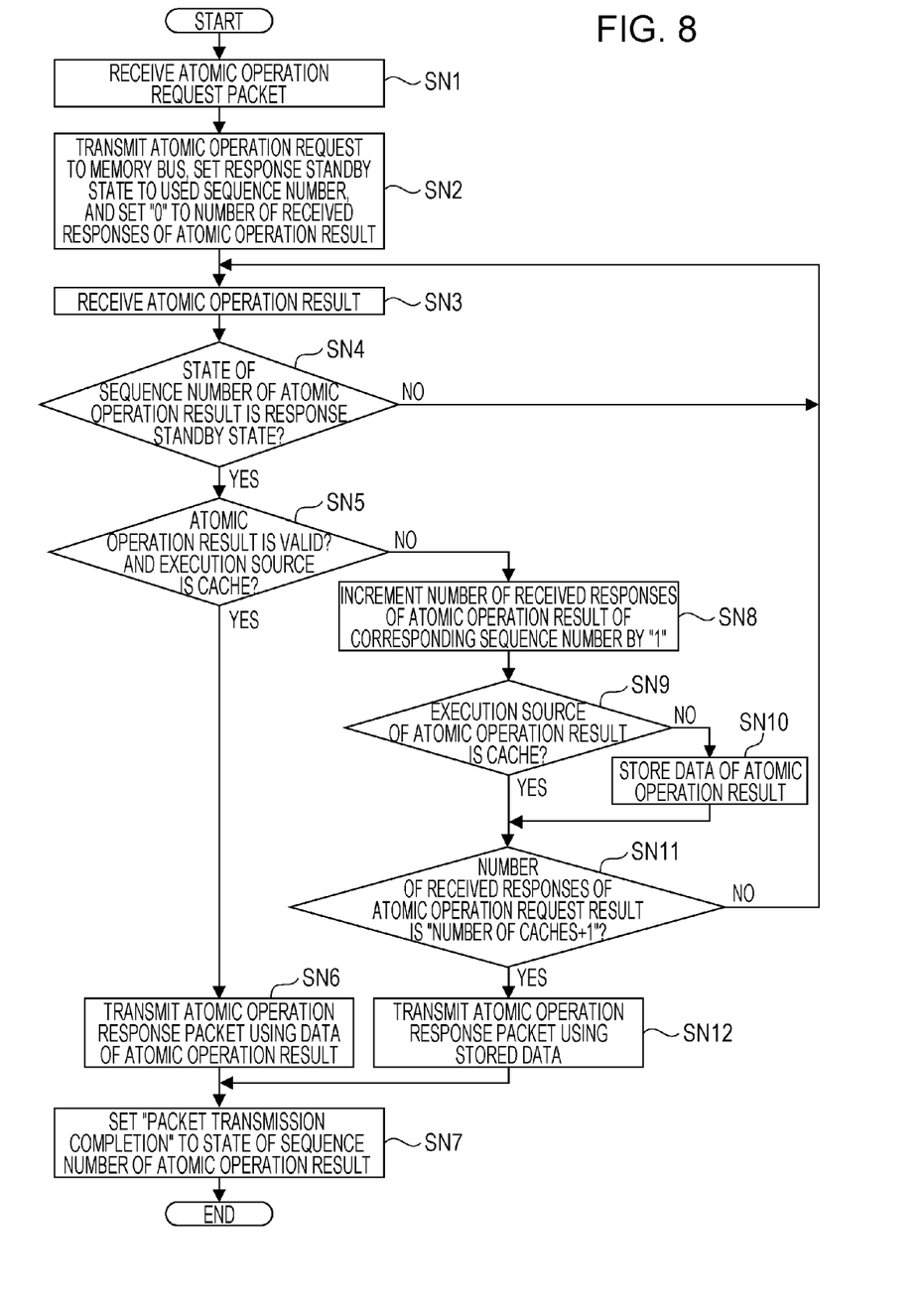
FIG. 8 is a flowchart illustrating atomic operation request packet processing.

FIG. 8 is a flowchart of atomic operation request packet processing. The atomic operation request packet processing is a flow of a series of pieces of processing until the packet reception unit 222 transmits an atomic operation response packet that is a response for an atomic operation request packet when the atomic operation request packet is received. The atomic operation request packet processing is described below in detail with reference to FIG. 8.

The packet reception unit 222 monitors a packet that has been transferred through the network 1, and receives an atomic operation request packet that is destined for the node 2, which has been transferred through the network 1 (SN1). The packet reception unit 222 assigns a sequence number to the received atomic operation request packet, generates an atomic operation request that stores the assigned sequence number, and outputs the generated atomic operation request to the memory bus 25. In addition, the packet reception unit 222 adds one entry to the processing status information 222a, and stores a sequence number, the number of received response "0", state data that indicates the standby state, and data that indicates "absence" in the added entry (SN2).

The packet reception unit 222 that has updated the processing status information 222a as described above waits for reception of a response of an atomic operation request (SN3). When the packet reception unit 222 receives a response, the packet reception unit 222 extracts one entry from the processing status information 222a using a sequence number in the received response, and determines whether or not state data of the extracted entry indicates "standby state" (referred to as "response standby state" in FIG. 8) (SN4). When the state data indicates "standby state", "Yes" is determined in SN4, and the flow proceeds to SN5. When the state data indicates "transmission completion state", "No" is determined in SN4, and the flow returns to SN3. The determination of "No" in SN4 indicates that a response of the atomic operation request for which the corresponding atomic operation response packet has been transmitted is received.

In SN5, the packet reception unit 222 determines whether or not valid data of the received response indicates execution of an atomic operation, and execution source data indicates one of the cache memories 212. When the received response is transmitted from one of the cache memories 212 that execute atomic operations, "Yes" is determined in SN5, and the flow proceeds to SN6. When valid data of the received response indicates non-execution of an atomic operation or execution source data of the received response indicates the main memory 23, "No" is determined in SN5, and the flow proceeds to SN8.

In SN6, the packet reception unit 222 generates an atomic operation response packet in which data in the received response (referred to as "atomic operation result data" in FIG. 8) is used as a payload, and transmits the generated atomic operation response packet to the network 1. The transmission of the generated atomic operation response packet to the network 1 is performed so that the packet reception unit 222 outputs the generated atomic operation response packet to the packet transmission unit 221, and requests the packet transmission unit 221 to transmit the atomic operation response packet.

After that, the packet reception unit 222 that has caused the atomic operation response packet to be transmitted updates state data of an entry that includes a sequence number in the received response of the processing status information 222a to a content of "transmission completion state" (SN7). After such update of the processing status information 222a, the atomic operation request packet processing ends.

When the flow proceeds to SN8 after "No" is determined in SN5, the packet reception unit 222 increments a value of data of the number of received responses of the entry that includes the sequence number in the received response of the processing status information 222a. After that, the packet reception unit 222 determines whether or not execution source data of the received response indicates one of the cache memories 212 (SN9). When the received response is transmitted from one of the cache memories 212, "Yes" is determined in SN9, and the flow proceeds to SN11. When the received response is transmitted from the main memory 23, "No" is determined in SN9, and the flow proceeds to SN10.

In SN10, the packet reception unit 222 stores the data in the received response and updates the content of the data of the entry that includes the sequence number in the received response of the processing status information 222a to "presence". After such update, the flow proceeds to SN11.

In SN11, the packet reception unit 222 determines whether or not a value of data of the number of received responses of the entry that includes sequence number in the received response of the processing status information 222a is equal to a value that is obtained by adding "1" to the number of the cache memories 212. When responses of all of the cache memories 212 and the main memory 23 are received, the value of the data of the number of received responses becomes equal to the addition result, that is, the number of all of the cache memories 212+1. Therefore, "Yes" is determined in SN11, and the flow proceeds to SN12. When a response from one of the cache memories 212 and the main memory 23 is not received, "No" is determined in SN11, and the flow returns to SN3.

In SN12, the packet reception unit 222 generates an atomic operation response packet in which the data that has been stored in SN10 is used as a payload, and transmits the generated atomic operation response packet to the network 1. After that, the flow proceeds to SN7.

As described above, in the embodiment, when a response that includes data that is to be used to generate an atomic operation response packet is not received from one of the cache memories 212, the atomic operation response packet is transmitted after all responses are received. In view of a difference between processing speeds, generally, the main memory 23 transmits a response that has been received last by the packet reception unit 222. Therefore, when a response that indicates execution of an atomic operation is output from one of the cache memories 212, an atomic operation response packet is replied further rapidly. Thus, latency at the time of an atomic operation between the nodes 2 is further reduced. The cache coherency between the nodes 2 is kept when each of the cache memories 212 and the main memory 23 is caused to execute a desired atomic operation.

Before the packet reception unit 222 receives a response from the main memory 23, the packet reception unit 222 generally receives responses from all of the cache memories 212. Therefore, when the packet reception unit 222 receives responses from all of the cache memories 212, even when a response from the main memory 23 is waited for, generally, the standby state does not cause reduction in the performance of the parallel computer system.

In the embodiment, processing of a response for an atomic operation request and generation of an atomic operation response packet are performed by the packet reception unit 222, but the processing of a response for an atomic operation request and the generation of an atomic operation response packet may be executed by a further configuration element. All or a part of these pieces of processing may be executed, for example, by the control unit 224.

In addition, in the embodiment, processing of an atomic operation request is caused to be executed by each of the cache memories 212 that are installed in the processor 21, but a controller that is caused to process an atomic operation request may be provided separately from the cache memory 212. The separately-provided controller may be caused to process atomic operation requests for the plurality of cache memories 212.

In the embodiment, the main memory 23 is also caused to execute an atomic operation, but the main memory 23 may be excluded from targets that are caused to execute atomic operations. Here, data after an atomic operation is executed on the cache memory 212 may be used as a reply for a read request to the corresponding data on the main memory 23. A cache line of data that may be used as a reply is a cache line the state of which is the M state or the O state.

Various modifications may be executed in addition to the above-described examples.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel computer system comprising:
   a plurality of information processing devices, each of the plurality of information processing devices including a communication control device that performs communication, a main memory that stores data, and an arithmetic processing device that is coupled to the communication control device and the main memory, the plurality of information processing devices being coupled to each other through a network by the respective communication control device, wherein
   the arithmetic processing device includes a cache memory and a cache controller, the cache controller that
   executes an atomic operation for target data on the cache memory that stores the target data when the communication control device outputs an atomic operation request that is used to request the atomic operation, the atomic operation being not divided into a smaller operation, and
   notifies the communication control device of a result that is obtained by executing the atomic operation on the cache memory, wherein
   the main memory includes a main memory controller that executes the atomic operation for the target data when the communication control device outputs the atomic operation request, and notifies the communication control device of a result that is obtained by executing the atomic operation for the target data.

2. The parallel computer system according to claim 1, wherein
   the communication control device includes,
   a request unit that outputs the atomic operation request to the arithmetic processing device and the main memory when an atomic operation request message for requesting the atomic operation is received by the request unit, the atomic operation request message being transmitted through the network,
   a reception unit that receives first processing result notification, from one of the arithmetic processing device and the main memory, that is notification of a processing result obtained by executing the atomic operation in response to the atomic operation request that is output from the request unit, and
   a control unit that determines second processing result notification that is used to generate a response for the atomic operation request message on the basis of a transmission source information and execution information of the atomic operation, the transmission source information and the execution information being included the first processing result notification received by the reception unit, generates the response using the determined second processing result notification, and outputs the generated response to the network.

3. The parallel computer system according to claim 2, wherein
   the control unit generates the response using execution notification that indicates that the atomic operation is executed on the cache memory when the reception unit receives the execution notification, and generates the response using the first processing result notification from the main memory when the reception unit receives the processing result notification from the main memory without receiving the execution notification.

4. A control method of a parallel computer system, the parallel computer system including,
a plurality of information processing devices, each of the plurality of information processing devices including a communication control device that performs communication,
a main memory that stores data, and
an arithmetic processing device that is coupled to the communication control device and the main memory, the plurality of information processing devices being coupled to each other through a network by the respective communication control device,
the control method comprising:
executing an atomic operation for target data on a cache memory that stores the target data when the communication control device outputs an atomic operation request that is used to request the atomic operation by the arithmetic processing device; and
notifying the communication control device of a result that is obtained by executing the atomic operation on the cache memory by the arithmetic processing device, wherein
the communication control device includes,
a request unit that outputs the atomic operation request to the arithmetic processing device and the main memory when an atomic operation request message for requesting the atomic operation is received by the request unit, the atomic operation request message being transmitted through the network,
a reception unit that receives first processing result notification, from one of the arithmetic processing device and the main memory, that is notification of a processing result obtained by executing the atomic operation in response to the atomic operation request that is output from the request unit, and
a control unit that determines second processing result notification that is used to generate a response for the atomic operation request message on the basis of a transmission source information and execution information of the atomic operation, the transmission source information and the execution information being included the first processing result notification received by the reception unit, generates the response using the determined second processing result notification, and outputs the generated response to the network, and wherein
the control unit generates the response using execution notification that indicates that the atomic operation is executed on the cache memory when the reception unit receives the execution notification, and generates the response using the first processing result notification from the main memory when the reception unit receives the processing result notification from the main memory without receiving the execution notification.

5. A communication control device that is coupled to an arithmetic processing device being coupled to a main memory that stores data, and including a processing unit that executes an atomic operation for target data on a cache memory that stores the target data when the communication control device outputs an atomic operation request that is used to request the atomic operation, and a notification unit that notifies the communication control device of a result that is obtained by executing the atomic operation on the cache memory, the communication control device comprising:
a request unit that outputs the atomic operation request to the arithmetic processing device and the main memory when an atomic operation request message that is a message that is transmitted through a network in order to request the atomic operation is received;
a reception unit that receives processing result notification that is notification of a processing result that is obtained by executing the atomic operation by the atomic operation request that is output from the request unit, from one of the arithmetic processing device and the main memory; and
a control unit that determines processing result notification that is used to generate a response for the atomic operation request message, generates the response using the determined processing result notification, and outputs the generated response to the network, based on a transmission source of the processing result notification that is received by the reception unit and execution information of the atomic operation, which is indicated by the processing result notification, wherein
the control unit generates the response using execution notification that indicates that the atomic operation is executed on the cache memory when the reception unit receives the execution notification, and generates the response using the first processing result notification from the main memory when the reception unit receives the processing result notification from the main memory without receiving the execution notification.

6. A parallel computer system comprising:
a plurality of information processing devices, each of the plurality of information processing devices including a communication control device that performs communication, a main memory that stores data, and an arithmetic processing device that is coupled to the communication control device and the main memory, the plurality of information processing devices being coupled to each other through a network by the respective communication control device, wherein
the arithmetic processing device includes a cache memory and a cache controller, the cache controller that
executes an atomic operation for target data on the cache memory that stores the target data when the communication control device outputs an atomic operation request that is used to request the atomic operation, the atomic operation being not divided into a smaller operation, and
notifies the communication control device of a result that is obtained by executing the atomic operation on the cache memory, wherein
the main memory includes a main memory controller that executes the atomic operation for the target data when the communication control device outputs the atomic operation request, and notifies the communication control device of a result that is obtained by executing the atomic operation for the target data, wherein
the communication control device includes,
a request unit that outputs the atomic operation request to the arithmetic processing device and the main memory when an atomic operation request message for requesting the atomic operation is received by the request unit, the atomic operation request message being transmitted through the network, a reception unit that receives first processing result notification, from one of the arithmetic processing device and the main memory, that is notification of a processing result obtained by executing the atomic operation in response to the atomic operation request that is output from the request unit, and a control unit that determines second processing result notification that is used to generate a response for the atomic operation request message on the basis of a transmission source information and execution information of the atomic operation, the transmission source information and the execution information being included the first processing result notification received by the reception unit, generates the response using the determined second processing result notification, and outputs the generated response to the network, and wherein the control unit generates the response using execution notification that indicates that the atomic operation is executed on the cache memory when the reception unit receives the execution notification, and generates the response using the first processing result notification from the main memory when the reception unit receives the processing result notification from the main memory without receiving the execution notification.

* * * * *